(12) United States Patent
Gundlach

(10) Patent No.: US 6,442,257 B1
(45) Date of Patent: Aug. 27, 2002

(54) CONFIGURATION FOR CHARGING IN A TELEPHONE NETWORK AND METHOD FOR OPERATING SUCH A CONFIGURATION

(75) Inventor: Michael Gundlach, München (DE)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 09/594,909

(22) Filed: Jun. 15, 2000

(30) Foreign Application Priority Data

Jun. 15, 1999 (DE) .......................................... 199 27 296

(51) Int. Cl.[7] .......................................... H04M 15/00
(52) U.S. Cl. .............................. 379/114.01; 379/114.21; 379/114.22; 379/114.23; 379/112.01; 379/127.05
(58) Field of Search .......................... 379/111, 112.01, 379/114.03, 114.05, 114.21, 114.22, 114.23, 114.26, 114.28, 127.03, 127.05, 128, 129, 207.02, 207.03, 114.01; 455/405, 406, 407, 408

(56) References Cited

U.S. PATENT DOCUMENTS

| 5,381,467 | A | * | 1/1995 | Rosinski et al. | 379/114.01 |
| 5,754,633 | A | * | 5/1998 | Levy | 379/114.01 |
| 5,822,411 | A | * | 10/1998 | Swale et al. | 379/114.21 |
| 6,205,211 | B1 | * | 3/2001 | Thomas et al. | 379/114.01 |
| 6,208,722 | B1 | * | 3/2001 | Sawatzki et al. | 379/144 |
| 6,240,402 | B1 | * | 5/2001 | Lynch-Aird | 705/400 |

* cited by examiner

Primary Examiner—Stella Woo
Assistant Examiner—Quoc Tran
(74) Attorney, Agent, or Firm—Laurence A. Greenberg; Werner H. Stemer; Ralph E. Locher

(57) ABSTRACT

A configuration for charging in a telephone network, wherein a first subscriber pays for at least a part of the charges for connections established to him by a second subscriber. An intelligent network is linked to the telephone network and a service control point or a service node of the intelligent network exhibits control means for allocating charges to the first subscriber for connections established by the second subscriber to the first subscriber.

20 Claims, 3 Drawing Sheets

CONFIGURATION FOR CHARGING IN A TELEPHONE NETWORK AND METHOD FOR OPERATING SUCH A CONFIGURATION

BACKGROUND OF THE INVENTION

Field of the Invention

The invention relates to a configuration for charging in a telephone network such that a first subscriber pays for at least a part of the charges for connections established to him by a second subscriber, and to a method for operating such a configuration.

In modern business life, telephone contacts are of great importance and in recent years their significance has increased steadily in connection with the rapid development of modern telephony and also with the associated electronic data processing. There is no end to this development in sight.

In this connection, an increasing number of companies are practicing the setting-up of no-charge or low-charge call numbers such as the 0130 or 0800 service (free of charge), or the 0180 services (reduced charge). This practice is based on the concept that customers value no-charge or low-charge telephone contact as an essentially provided service of the corresponding company, and like to utilize it, whereas in many cases they otherwise would not conduct telephone conversations charged at normal rates, and then would probably not maintain the contact to the corresponding company.

However, setting up no-charge call numbers has the disadvantage that these call numbers are, in principle, accessible without restriction to anybody and can therefore be misused which, indeed, happens in practice. Thus, malicious callers can generate, possibly even by means of automatically generated calls, a considerable charge burden for the company that has set up a no-charge or low-charge call number. In addition, such practices have the consequence that the corresponding call number is occupied an unnecessary number of times and largely loses its value for the remaining customers.

SUMMARY OF THE INVENTION

It is accordingly an object of the invention to provide an improved generic configuration and a method for operating such a configuration which overcomes the hereinafore-mentioned disadvantages of the heretofore-known methods and devices of this general type in such a way that a misuse of the provision for establishing a no-charge or low-charge telephone contact with a particular subscriber can be largely prevented.

With the foregoing and other objects in view there is provided, in accordance with the invention, a configuration for charging in a telephone network wherein a first subscriber pays for at least a part of the charges incurred for connections established by a second subscriber to the first subscriber. The configuration includes a telephone network and an intelligent network linked thereto. A charge concession database is provided for storing identifiers selected from the group consisting of call numbers and call number ranges. Control means, configured within the intelligent network, is provided for allocating charges for a connection established from a second subscriber to a first subscriber by comparing a call number of the second subscriber with the identifiers. Additionally, an access device is provided for performing an operation selected from the group consisting of inputting, modifying, and deleting at least one of the identifiers stored in the charge concession database.

With the foregoing and other objects in view there is also provided, in accordance with the invention, a method for charging in a telephone network wherein a first subscriber pays for at least a part of the charges incurred for connections established by a second subscriber to the first subscriber. The method includes linking a telephone network to an intelligent network. Identifiers selected from the group consisting of call numbers and call number ranges are stored within a charge concession database. The intelligent network is provided with control means to allocate charges for a connection established from a second subscriber to a first subscriber by comparing a call number of the second subscriber with the identifiers. Additionally an access device is used to perform an operation selected from the group consisting of inputting, modifying, and deleting at least one of the identifiers stored in the charge concession database.

In accordance with an added feature of the invention, there is provided the essential idea of granting the authorization for no-charge or low-charge calls only to selected further network subscribers, and also of withdrawing this authorization again, if necessary, within a short time, on the basis of the capabilities of an intelligent network (IN) on the part of a first network subscriber. By limiting the authorized circle, a predetermined selection is made right from the start and thus misuse by unknown third parties is prevented. After a misuse by one of the privileged authorized parties has been found, the authorization can also be withdrawn again from him in a simple and rapid manner. Thus, a limited number of predetermined subscriber numbers or identifiers of authorized parties is continuously stored in the database which is why it can also be called a "white list".

In accordance with an additional feature of the invention, the charge concession database can also be organized in the manner of a "black list", i.e. contain only call numbers or identifiers of subscribers to whom no freedom or concession of charges is to be granted. Here, too, continuous updating by deleting or adding new entries is possible analogously to the first type of embodiment. Compared with the first manner of the embodiment of the principle (white list), this variant has the advantage that the circle of authorized persons is not restricted a priori, i.e. new customers that have not yet been registered can also enjoy the concession. The price for this advantage in advertising strategy is that one has to accept a slightly higher risk of misuse.

Finally, it is also possible to store certain ranges of call numbers for authorized persons in the database, for instance certain initial numbers or sequences of initial numbers of call numbers or also certain other identification features.

So that a normal subscriber of a fixed network or mobile radio telephone network can control the charge concession for his customers, a trigger point for triggering access to the charge concession database must be set in his associated service switching point, via which trigger point the setting-up of a connection to the service control point (SCP) is activated to which the charge concession database is linked in the manner of a service data point (SDP).

If, in contrast, the first subscriber—as a subscriber of Universal Personal Telecommunication (UPT) or of a cordless telephony network (CTM)—has a call number of the intelligent network, then the service switching point of the caller, instead, sets up switching to a SCP, in connection with which the charge concession facility can be activated. The trigger point is omitted in this case. This similarly applies to the case where the first subscriber subscribes to an IN-controlled "Number Portability" service, which should find widespread use in the future. Here, too, no special trigger point is required in the associated SSP because the associated switching point builds up a connection to the SCP, in any case, for such a subscriber.

In a so-called "distributed" intelligent network, the functions described can be controlled by a service node (SN) since there is no service control point as such in this case.

There are basically two possibilities for establishing and managing the charge concession database: the more comfortable possibility, which, in any case, is preferred for large companies, consists of management via the Internet or, more precisely, via a so-called web Customer Service Control (CSC). The second possibility consists of utilizing a normal telephone as an access device for the database, where entries, changes or deletions can be carried out by means of the Dual Tone Multiple Frequency (DTMF) method. In both cases, the first subscriber must naturally authenticate himself in a suitable manner, for example by entering a password (especially in the case of Internet access) or a PIN (especially when using a mobile telephone for inputting) or by other identification means, for example also of a physical type (fingerprint, retina pattern).

In accordance with another feature of the invention, notification is provided to the caller concerning the granting of eliminated or reduced charges of a call. This is advantageous since such a reduction or elimination of charges can no longer be seen from the call number itself in the proposed solution. As a rule, a voice message will be generated for the caller for this purpose. In special cases, however, other ways of notification are also possible, for example by using the Short Message Service (SMS) for mobile radio subscribers.

Other features which are considered as characteristic for the invention are set forth in the appended claims.

Although the invention is illustrated and described herein as embodied in a configuration for charging in a telephone network and method for operating such a configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
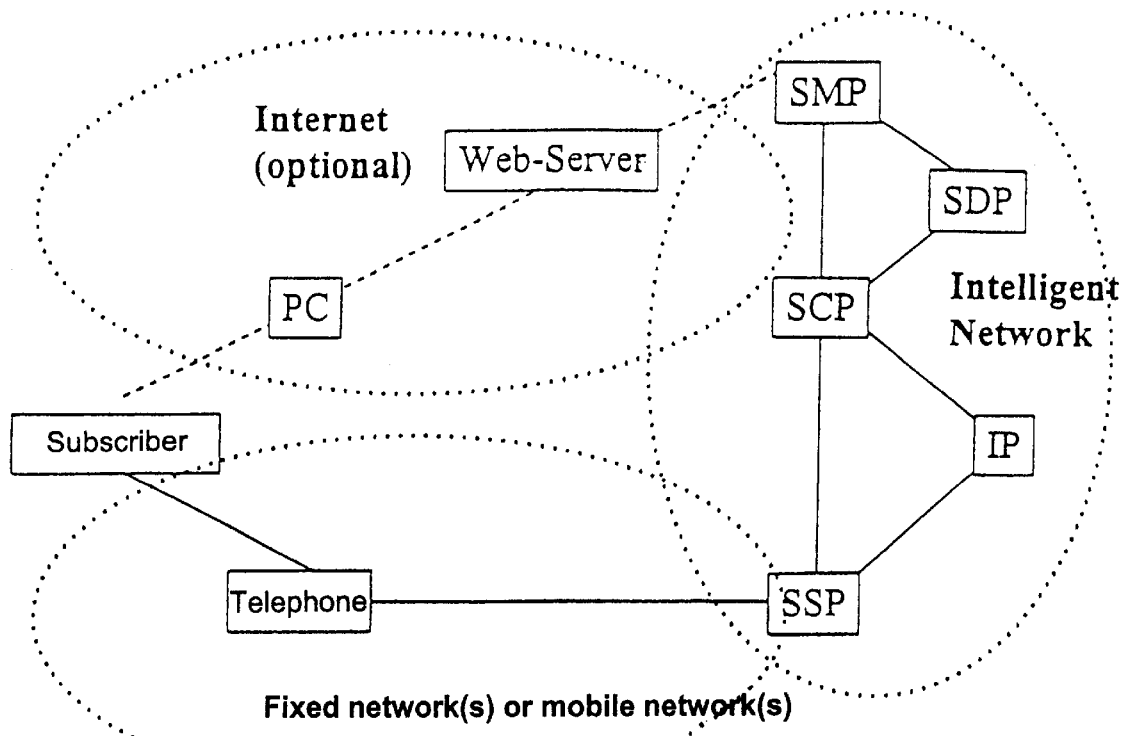
FIG. 1 shows a diagrammatic representation of a configuration according to a first embodiment of the invention which is based on a traditional intelligent network.

As can be seen from FIG. 1, the configuration comprises at least a fixed network or a mobile network including a telephone available to the subscriber, an intelligent network, and a service switching point SSP forming the interface between the fixed or mobile network and the intelligent network. On the one hand, the subscriber can access the charge concession database SDP via the service control point SCP, via the telephone and the SSP for inputting data into the charge concession database. On the other hand, he can be notified via the SCP and the SSP and, finally, via his telephone, where an information item on the regulation of charges is conveyed in a manner controlled by the intelligent peripheral IP.

As an alternative, the Internet (or also another IP network in special cases) can be used for inputting data; the subscriber inputting the charge concession data via a PC from where they reach the appointments database SDP via a dedicated web server and the service management point SMP of the intelligent network. This type of data input is more comfortable but assumes that additional resources are available.

Figure 2:
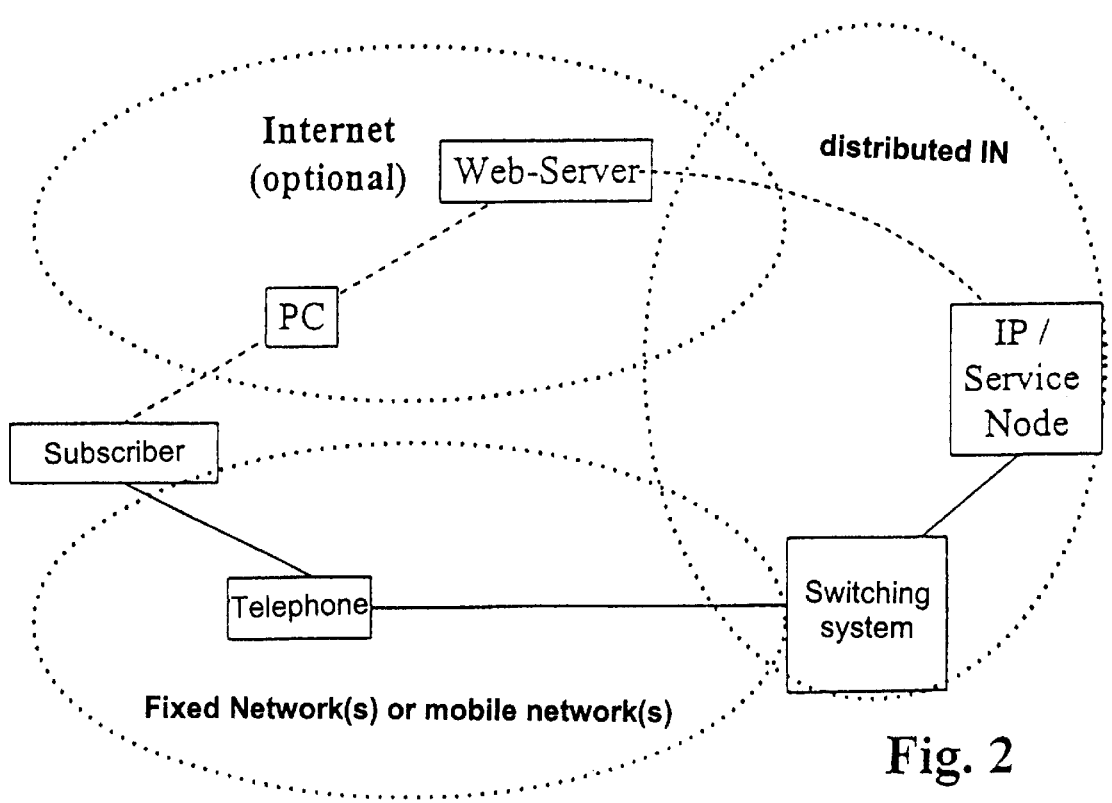
FIG. 2 shows a diagrammatic representation of a configuration according to a second embodiment of the invention which is implemented by means of a distributed intelligent network.

FIG. 2 outlines a modified architecture of the proposed configuration which is based on a so-called distributed intelligent network in which functions of the SMP, SCP (with SDP—the charge concession database in the present case), and the IP are combined in a functional unit to be called the IP/service node. This is connected directly to the web server of the Internet and via a switching system to a telephone in a fixed network or mobile network.

Figure 3:
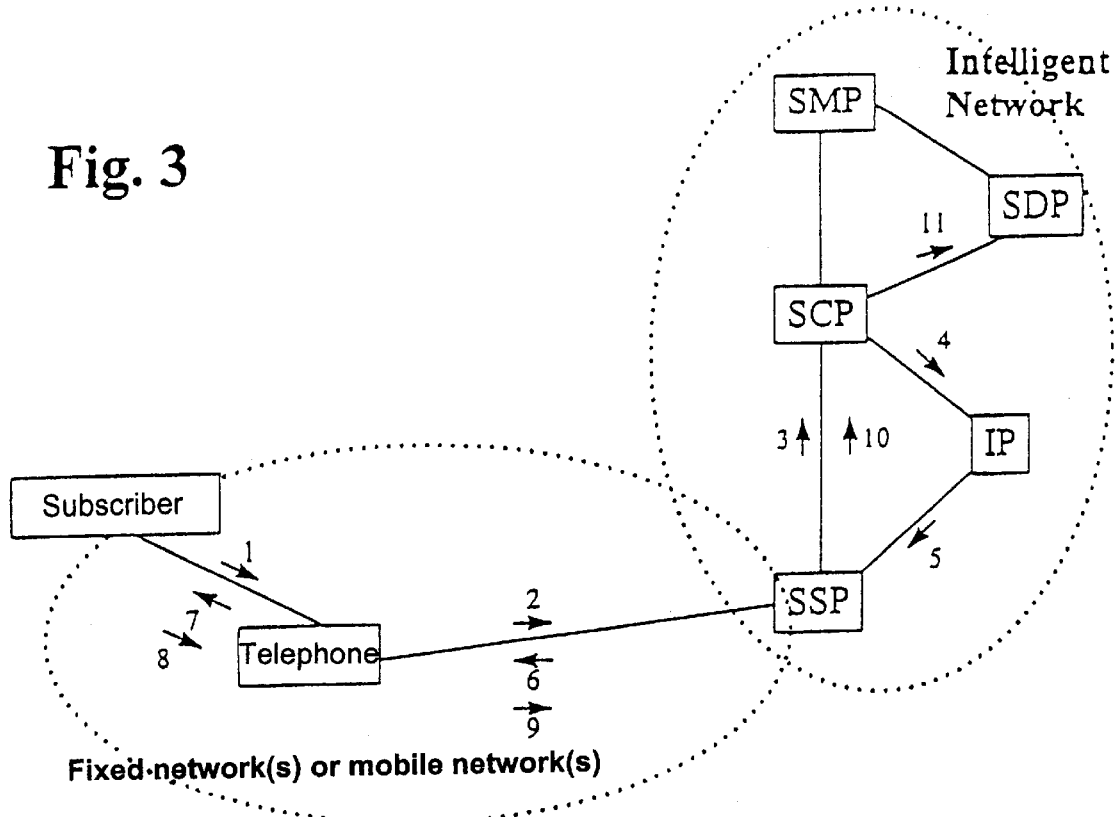
FIG. 3 shows a diagrammatic representation of the data input in the first embodiment, utilizing a fixed network or mobile radio terminal.

FIG. 3 outlines the data input via the telephone by means of the DTMF method in a sequence of steps from 1 to 11. Step 1 is the dialing of the IN number on the telephone from where it passes in a step 2 to the SSP from where a connection is established to the SCP in step 3. In step 4, an announcement control is effected from the SCP to the IP and the selected announcement is conveyed first to the SSP, then from the latter to the telephone and finally, from the telephone to the subscriber, in steps 5, 6 and 7. After the announcement has been perceived, the subscriber enters the charge concession data in a step 8, which then pass from the telephone to the SSP in step 9, from the SSP to the SCP in step 10 and into the charge concession database SDP in step 11. This concludes the tying-in of an authorized person into the charge concession database.

Figure 4:
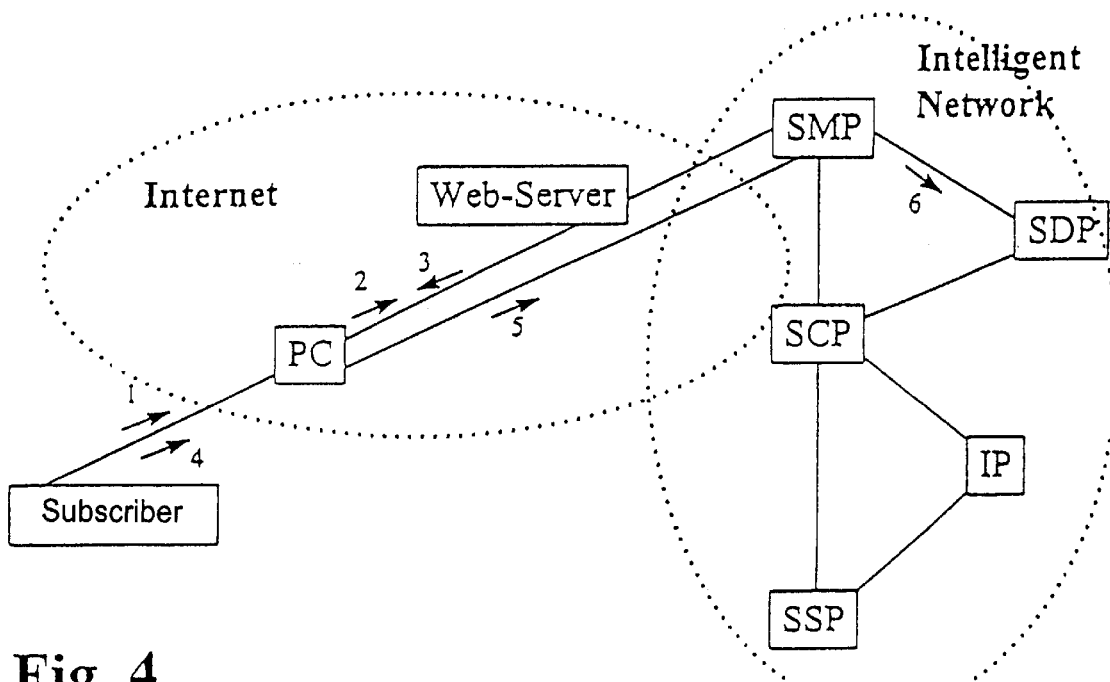
FIG. 4 shows a diagrammatic representation of the data input in the first embodiment, utilizing the Internet.

FIG. 4 outlines the data input by the subscriber utilizing his PC and the World Wide Web. Initially, the subscriber enters the http address at the PC in a step 1 and the PC then establishes a connection to the web server in a step 2, from where the corresponding page is downloaded in a step 3. Based on this downloaded Internet page, the charge concession data are entered at the PC in a step 4, from where they are conducted to the charge concession database SDP via the SMP of the intelligent network (steps 4 and 5).

Figure 5:
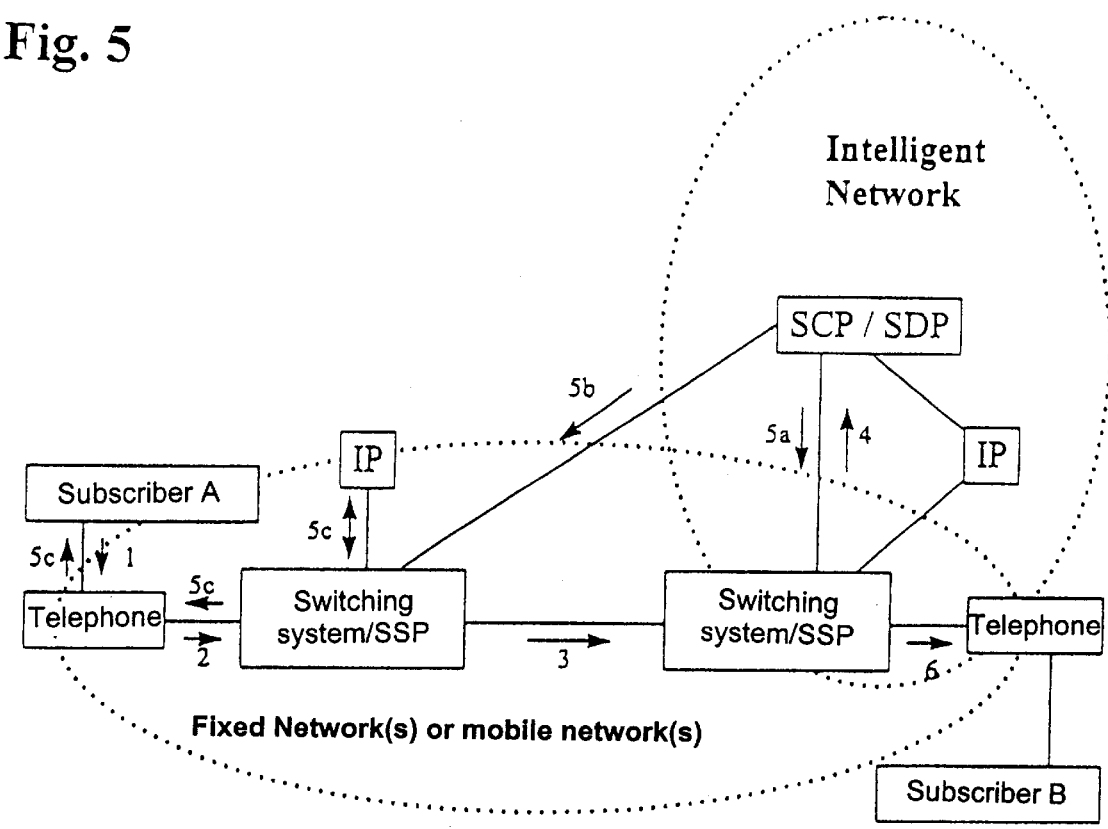
FIG. 5 shows a diagrammatic representation for controlling the charging in the first embodiment.
Figure 6:
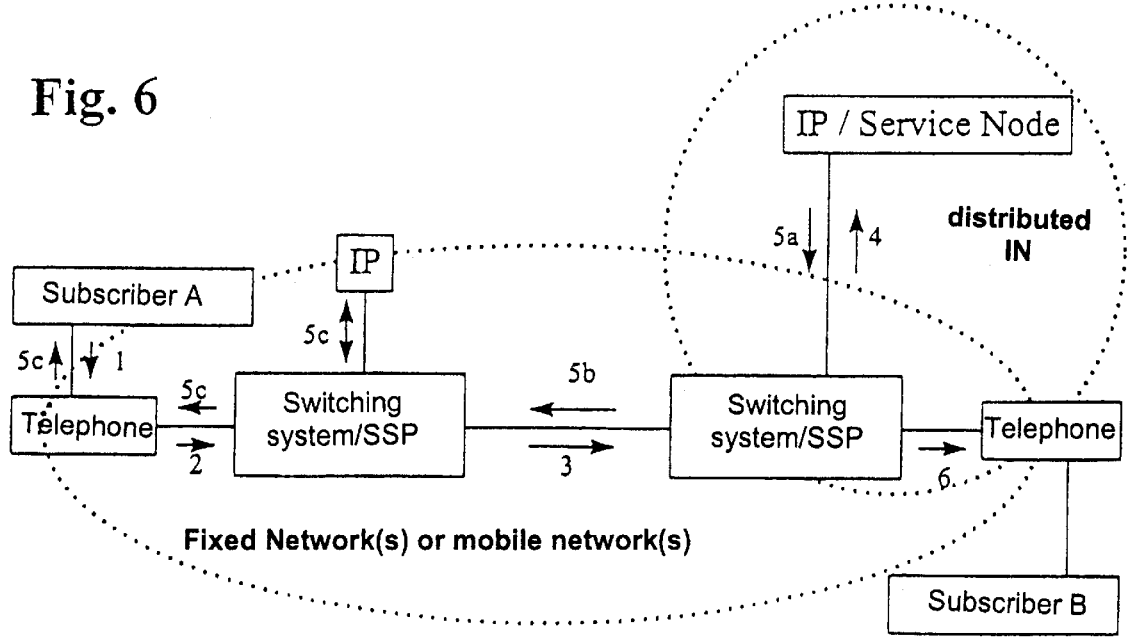
FIG. 6 shows a diagrammatic representation for controlling the charging in the second embodiment.

In the text which follows, the control of the charging in accordance with preferred embodiments of the invention is explained when a traditional or, respectively, a distributed intelligent network is used, referring to FIGS. 5 and 6. In these figures and the subsequent description, "subscriber B" or "call number B" designates the side granting the charge concession and "subscriber A" or "call number A" designates the side (customer) making use of a charge concession.

In both FIGS. 5 and 6, step 1 designates the step of dialing the call number B by subscriber A, step 2 designates the forwarding of the dialed call number from the fixed network or the mobile radio terminal (telephone) of subscriber A to the associated switching system/SSP, and step 3 designates the forwarding to the switching system/SSP of subscriber B. The latter, in traditional IN (FIG. 5), enquires from the service control point SCP, which is associated with the charge concession database SDP, who is to be charged for the connection set up. This is done by comparing the contents of a call number list of privileged or non-privileged subscribers A, stored in the charge concession database SDP, with the call number of the subscriber A currently calling. As a result of this comparison, a signal reflecting the result of the comparison and thus containing the response to the inquiry made in the step is conveyed to the switching system/SSP of subscriber B in step 5a. At the same time, a corresponding signal is output from the SCP to the switching system/SSP of subscriber A. The call to the telephone of subscriber B is finally switched through via the switching system/SSP of subscriber B in a step 6.

In the embodiment shown in FIGS. 5 and 6, a function is implemented which also sends a notification to subscriber A on the type of charging by means of an intelligent peripheral. This notification is implemented especially as a voice message (announcement) or a special display function on the display of the telephone of subscriber A, or also as a characteristic ringing tone in a step 5c.

The embodiment shown in FIG. 6 only differs slightly from that of FIG. 5 in the interaction of the switching system/SSP of subscriber A and of subscriber B and of both with the IP/service node of the distributed intelligent network. The difference in interaction is because the IP/service node is connected exclusively to the switching system SSP of subscriber B. The exclusive connection is why the above-mentioned step 5b of outputting a signal identifying the type of charging to the switching system/SSP of subscriber A must take place via the switching system/SSP of subscriber B.

The illustration in the two FIGS. 5 and 6 is based on the assumption that subscriber B is a conventional normal subscriber of a fixed network. The steps from step 3 onward must be appropriately modified for a subscriber B subscribing to a UPT service. In this case, further service control points may be involved in the sequence, for example a home SCP and a visited SCP of subscriber B, and there are additional relevant interfaces, for example between the switching system/SSP of subscriber A and a home SCP of subscriber B. The corresponding modifications can be found within the framework of technical practice on the basis of the relevant protocol-oriented interfaces and components.

Furthermore, the invention is not restricted to the embodiments described above but is also possible in a multiplicity of expert modifications.

I claim:

1. A configuration for charging in a telephone network wherein a first subscriber pays for at least a part of the charges incurred for connections established by a second subscriber to the first subscriber, comprising:
    a telephone network and an intelligent network linked thereto;
    a charge concession database for storing identifiers selected from the group consisting of call numbers and call number ranges;
    control means, configured within said intelligent network, for allocating charges for a connection established from a second subscriber to a first subscriber by comparing a call number of the second subscriber with the identifiers; and
    an access device for performing an operation selected from the group consisting of inputting, modifying, and deleting at least one of the identifiers stored in said charge concession database.

2. The configuration according to claim 1, wherein said intelligent network includes a service control point having said control means.

3. The configuration according to claim 2, wherein said control means utilizes a linking instruction that is implemented in an IN call number of the first subscriber for accessing said charge concession database via said service control point.

4. The configuration according to claim 1, wherein said intelligent network includes a service node having said control means.

5. The configuration according to claim 4, wherein said control means utilizes a linking instruction that is implemented in an IN call number of the first subscriber for accessing said charge concession database via said service node.

6. The configuration according to claim 1, wherein said control means includes a trigger point set in a service control point of the first subscriber for triggering access to said charge concession database.

7. The configuration according to claim 1, wherein said access device includes a device selected from the group consisting of a mobile radio of the first subscriber and a fixed network terminal of the first subscriber, an associated service switching point of said intelligent network, and an authentication device.

8. The configuration according to claim 7, wherein said authentication device is an input device for a personal identification number.

9. The configuration according to claim 1, wherein said access device includes an internet access device, a web server that can be connected to said internet access device, a service management point of said intelligent network, and an authentication device, said service management point capable of being connected to said web server.

10. The configuration according to claim 9, wherein said authentication device can input a password.

11. The configuration according to claim 1, wherein said charge concession database includes a list selected from the group consisting of a positive list of authorized call numbers of selected second subscribers and a negative list of non-authorized call numbers of second subscribers.

12. The configuration according to claim 1, wherein said intelligent network includes a service control point having said control means, said service control point associated with means for generating and conveying a message to the second subscriber, said message selected from the group consisting of a voice message and an SMS message.

13. A method for charging in a telephone network wherein a first subscriber pays for at least a part of the charges incurred for connections established by a second subscriber to the first subscriber, which comprises:
    linking a telephone network to an intelligent network;
    storing identifiers selected from the group consisting of call numbers and call number ranges within a charge concession database;
    providing the intelligent network with control means to allocate charges for a connection established from a second subscriber to a first subscriber by comparing a call number of the second subscriber with the identifiers; and
    using an access device to perform an operation selected from the group consisting of inputting, modifying, and deleting at least one of the identifiers stored in the charge concession database.

14. The method according to claim 13, which comprises providing the control means in a service control point.

15. The method according to claim 13, which comprises providing the control means in a service node.

16. The method according to claim 13, which comprises using a trigger point set in a service switching point of the first subscriber to trigger access to the charge concession database.

17. The method according to claim 13, which comprises implementing a linking instruction in an intelligent network call number of the first subscriber to organize access to the charge concession database.

18. The method according to claim 13, which comprises using an access device selected from the group consisting of a mobile radio and a fixed network terminal or telephone to perform the operation after an authentication via the access device and a service switching point of the first subscriber.

19. The method according to claim 13, which comprises performing the operation after an authentication via an internet access device of the first subscriber.

20. The method according to claim 13, which comprises, when a call from then second subscriber is accepted, outputting a message selected from the group consisting of a voice message and an SMS message to notify the second subscriber whether charge concession is authorized.

* * * * *